W. H. BULLOCH.
Turn-Tables for Microscope Slides.
No. 226,648. Patented April 20, 1880.
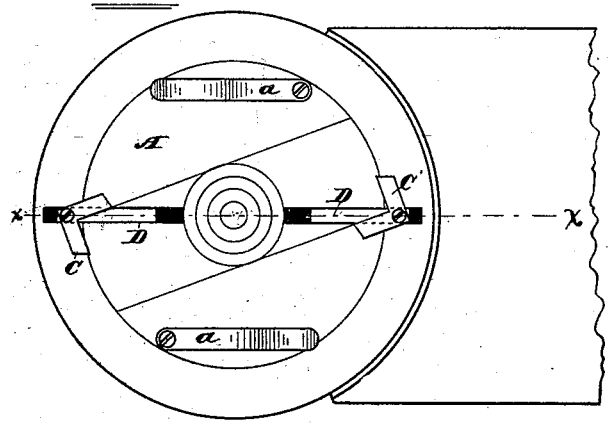
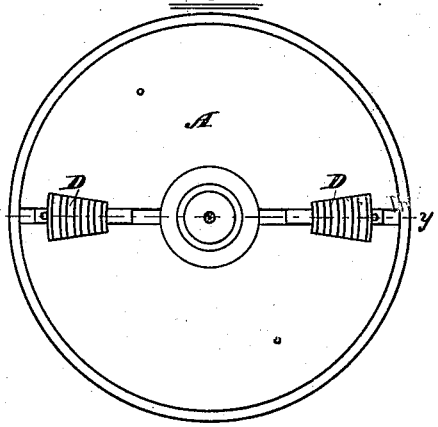
Attest:
Herman Lours
James Feltham
INVENTOR:
Walter H Bulloch

UNITED STATES PATENT OFFICE.

WALTER H. BULLOCH, OF CHICAGO, ILLINOIS.

TURN-TABLE FOR MICROSCOPE-SLIDES.

SPECIFICATION forming part of Letters Patent No. 226,648, dated April 20, 1880.

Application filed January 20, 1880.

*To ...l whom it may concern:*

Be it known that I, WALTER H. BULLOCH, of the city of Chicago, Cook county, Illinois, have invented a new and useful Improvement in Microscope Accessories, of which the following is a specification.

The object of my invention is to produce a device for holding and revolving slips of glass on which it is desired to paint circles to be used in mounting microscopical specimens.

The invention consists in the means used to adjust the glass and hold it in the center while being revolved, and in the means employed to piv... ajury to the supporting-pivot when the instrument is not in use.

In the accompanying drawings, Figure 1 is a top view of the upper part (revolving portion) of the device. Fig. 2 is a side view in section through *x x*. Fig. 3 is a view of under side of the top plate. Fig. 5 is a section of the same. Fig. 4 is a top view of the lower part of the revolving portion. Fig. 6 is a section of the same. Fig. 7 is a section of the revolving sleeve. Fig. 8 is a section of the central fixed point of support; Fig. 9, the jaws or clamps, and Fig. 10 shows the teeth that are engaged to move the clamps forming the glass-holder or jaws.

The device consists of a small circular table having two necessary parts, A and B. The part A (shown clearly in Fig. 1) forms a rest for the glass to be operated on. It has spring *a a* to hold a glass down, and jaws C C. (Shown clearly in Fig. 9.) The jaws slide on the plate A, being fastened to the teeth D, (shown in Fig. 10,) which are placed on the under side of the plate, oblong openings being made in the plate to allow of this fastening and a proper radial movement of the jaws. The plate B is placed under the plate A. It has a volute screw-thread cut on its upper surface of proper size to receive the teeth D, and is placed in contact therewith, so that a revolution of the plate B in relation to the plate A will cause the teeth D, and with them the jaws C C, to move nearer to or farther from each other, each maintaining an equidistant position from the center. Below B, but fastened to A and supporting the plate B, is a sleeve or hollow shaft, E. (Shown in Fig. 7.) Its use is to keep the plates A and B in their desired position, and to support the table when it is not in use. Below the sleeve E is the nut G. It may be either screwed to the sleeve or the pin which the sleeve surrounds. Its function is to lift or lower the sleeve, and with it the table A and plate B. Inclosed in the sleeve is a vertical shaft, F, having a sharp point, Y, which I prefer to make of some hard material, such as hardened steel. This point Y is made to enter a small conical indentation on the under side of A, and of such shape as to allow of the latter freely revolving. The shaft F has an annular groove at H, in which a screw enters, allowing the sleeve to turn on it, but not rise but a small amount on the shaft. Its use is self-evident. The shaft F is fastened to a proper base or convenient independent support by any suitable means.

In using the device, a slip of glass about one inch wide and three inches long is placed within the jaws upon the table A. The plate B is then revolved under it, moving the jaws in such a manner as to clamp and retain the glass, which is then in position to be operated on.

The operation consists in revolving the table resting on the pivot with the fingers of one hand, while the other hand holds a brush containing the material to form the rings.

I claim as my invention—

1. The table A, having jaws C C, teeth D, and volute screw-plate B, in combination with the vertical shaft F, on which it freely revolves, substantially as and for the purpose described.

2. The volute screw-plate B, in combination with the sleeve E and pivotal support F, substantially as described and shown.

3. A device consisting of the following elements: a revolving table, A, sleeve E, pointed support F, and nut G, arranged and operated substantially as described and shown.

WALTER H. BULLOCH.

Witnesses:
 JAMES FELTHAM,
 CHAS. J. DAVIS.